United States Patent [19]
Helbig

[11] Patent Number: 5,950,764
[45] Date of Patent: Sep. 14, 1999

[54] LUBRICATING DEVICE FOR ROTATING PARTS, ESPECIALLY A ROTATING HOLLOW SHAFT

[76] Inventor: Claus Helbig, Steinweg 35, D-97453 Schonungen, Germany

[21] Appl. No.: 09/037,269

[22] Filed: Mar. 9, 1998

[30] Foreign Application Priority Data

Mar. 11, 1997 [DE] Germany ............................ 19709680

[51] Int. Cl.⁶ .................................................. F01M 11/04
[52] U.S. Cl. ......................... 184/105.1; 184/43; 239/322; 222/389
[58] Field of Search ............... 184/105.1, 105.2, 184/43; 239/67, 99, 321, 322, 331, 332, 329, 373; 222/61, 389

[56] References Cited

U.S. PATENT DOCUMENTS

| | | | |
|---|---|---|---|
| 3,789,510 | 2/1974 | Richter, Jr. et al. ........................ | 33/3.6 |
| 5,249,645 | 10/1993 | Wiklund ................................. | 184/55.1 |
| 5,404,966 | 4/1995 | Yang ..................................... | 222/389 |
| 5,460,242 | 10/1995 | Graf ...................................... | 222/389 |
| 5,634,531 | 6/1997 | Graf et al. ............................. | 184/108 |

FOREIGN PATENT DOCUMENTS 58-146793  9/1983  Japan ........................................ 184/43

Primary Examiner—John A. Jeffery
Assistant Examiner—Chong H. Kim
Attorney, Agent, or Firm—Herbert Dubno

[57] ABSTRACT

A device for lubricating a rotatable member such as a hollow shaft on which another member is axially displaceable, has a lubricant container received in the hollow shaft and in which a piston is displaceable by a gas generated by a gas-generating cell or by a motor-driven spindle. The electrical circuit includes a centrifugal-force sensor received in the container and having switches connected in that circuit so that when a certain speed of rotation is reached, the lubricant is dispensed and the circuit is de-energized upon standstill.

12 Claims, 3 Drawing Sheets

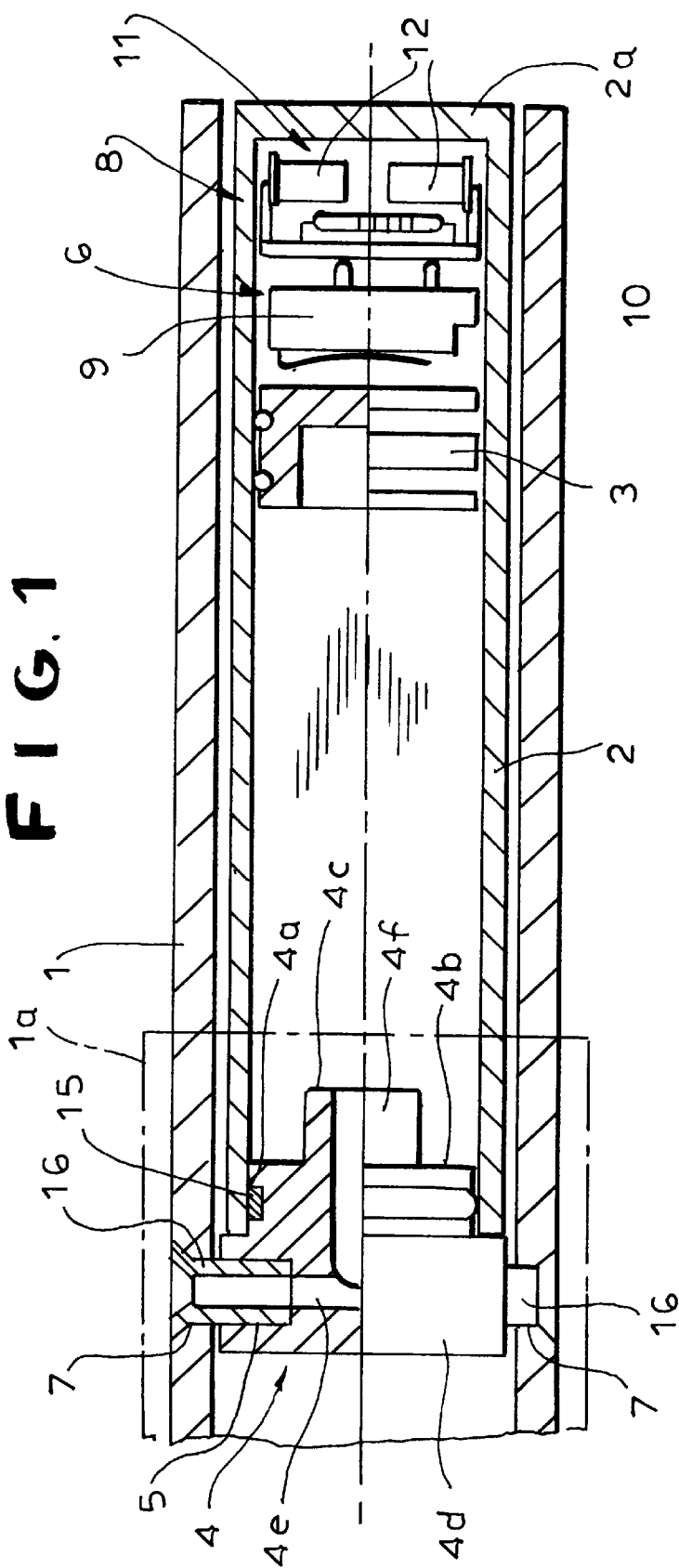
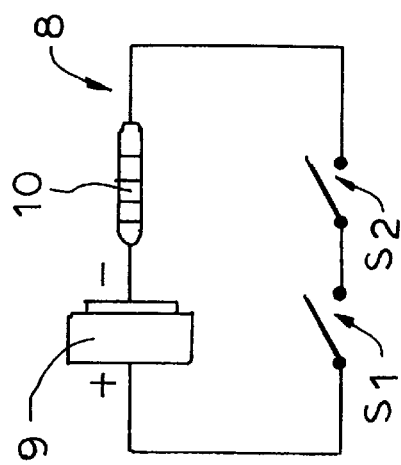

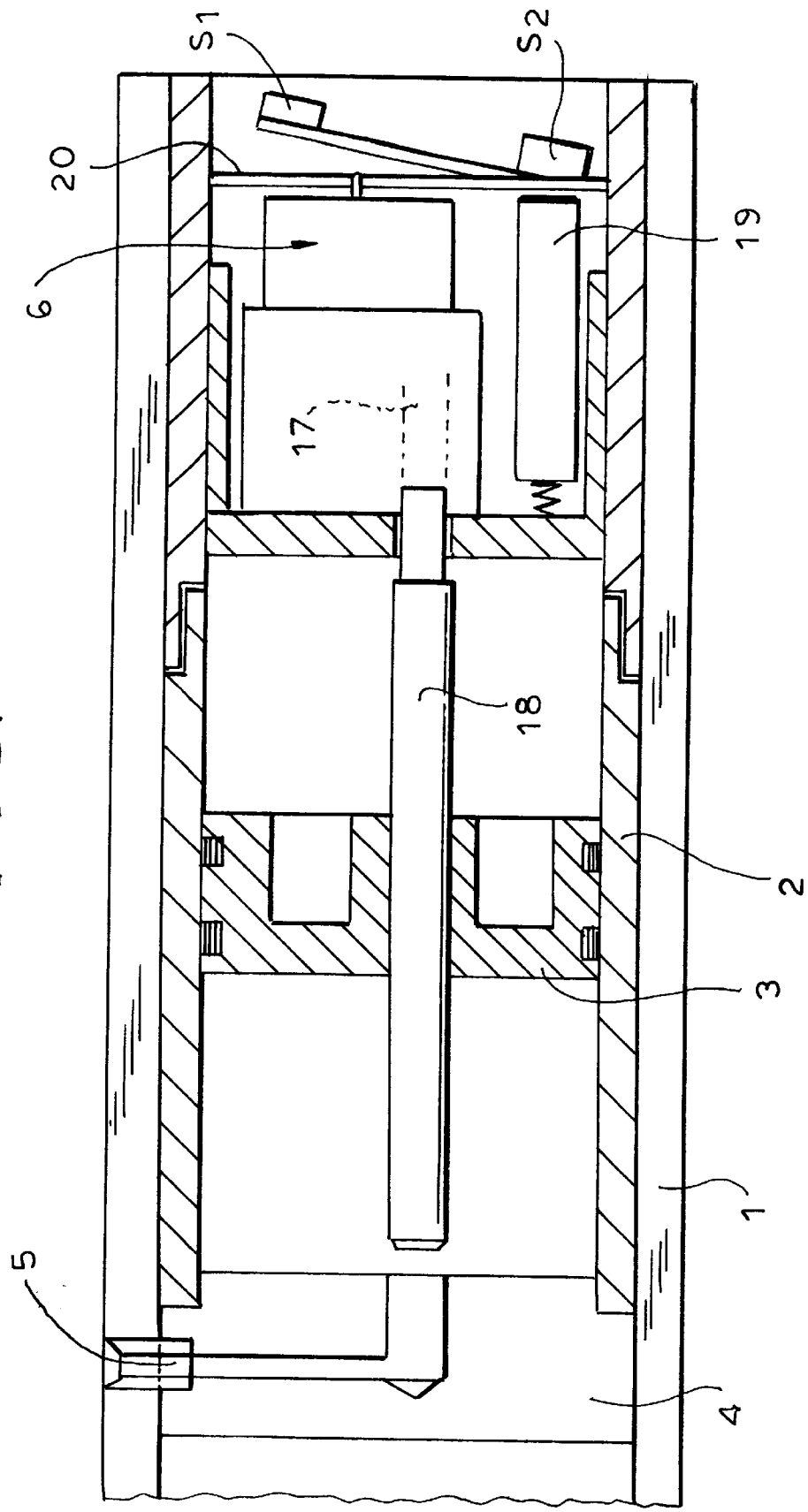

… …

LUBRICATING DEVICE FOR ROTATING PARTS, ESPECIALLY A ROTATING HOLLOW SHAFT

FIELD OF THE INVENTION

My present invention relates to a lubricating device for rotating parts, especially a rotating hollow shaft. More particularly, the invention relates to a lubricating device for such rotating parts which is capable of dispensing lubricant only during rotation of that part or the hollow shaft.

BACKGROUND OF THE INVENTION

Hollow shafts can be provided with sleeves, shells or other members along the exterior thereof and frequently lubrication of the outer surface of the hollow shaft may be desirable so that the outer member can move, e.g. axially along the hollow shaft. This can be the case, for example, in a clutch or coupling in which the outer member is keyed to the hollow shaft, is coupled therewith rotationally by a spline or other noncircular formation on the hollow shaft or is so connected to the hollow shaft that torque can be transmitted between them but relative axial movement is possible. The lubricant should be introduced between the juxtaposed surfaces of the hollow shaft and the surrounding member.

Lubricant-dispenser devices in the past have included lubricant containers, a piston displaceable in the lubricant container, an electrical circuit for driving the piston and some kind of manual switching arrangement which allows the circuit to be effective or ineffective with respect to the drive of the piston.

Usually these lubricating devices, especially if they include a gas-generating unit with, for example, an electrochemical gas-generating cell or a battery-driven electric motor system, have been located externally of the member to be lubricated and are either continuously operated whether or not the parts are rotating, or are operated by manual switching solely as a function of the turning on and off of a switch.

In cases in which a back and forth or oscillating or pendulum-type movement is superimposed upon an axial movement, lubrication of the outer surface of a machine part may not be possible with earlier devices and hence one may have to resort to manual lubrication at certain lubrication times during standstill of the apparatus.

OBJECTS OF THE INVENTION

It is, therefore, the principal object of the present invention to provide a lubricating device which automatically effects lubrication of a rotary member during rotation thereof and thus can overcome drawbacks of earlier systems.

Another object of this invention is to provide a lubricating device which is especially effective for lubricating a surface of a rotatable part and which does not require manual intervention.

SUMMARY OF THE INVENTION

These objects and others which will become apparent hereinafter are attained, in accordance with the invention, by providing a centrifugally-operated switching device or a centrifugal-force sensor on the rotating part, connected in a circuit for activating the drive of the piston of the lubricating device so that, only upon the sensing of rotation, is the piston driven and lubricant expressed from a lubricant channel to the location between the juxtaposed surfaces of two relatively moving parts for lubrication of the motion therebetween.

The invention is suitable for use between members which move relatively in an axial direction and between members which have a pendulum-type or oscillatory movement superimposed upon the axial movement. The invention is especially effective for lubricating devices for hollow shafts and telescoping tube arrangements, for systems which, as described, can serve as clutch or coupling elements for torque transmission or between rotating parts generally.

According to a feature of the invention, the apparatus for lubricating a surface of a rotating part, especially a rotating hollow shaft, comprises a lubricant container affixed on one of the parts, a piston displaceable in the lubricant container, a closure for the lubricant container which comprises at least one outlet for the lubricant, a drive unit in the lubricant container for displacing the piston, and a centrifugal force switching device or sensor in circuit with the drive circuit and which has switches closing when the apparatus is set into rotation to effect lubrication. When the part is brought to standstill, the electric circuit opens and the drive unit is de-energized and brought to standstill.

The lubricating device thus can comprise:

a lubricant container on the rotatable member;

a piston in the container shiftable to displace lubricant in the container toward an end thereof;

a closure in the end of the container provided with a discharge passage opening at a surface of the member for dispensing the lubricant onto the surface upon displacement of the piston;

drive means in the container for shifting the piston and including an electrical circuit and a centrifugal force sensor in the circuit for closing the circuit upon rotation of the member to displace the piston and dispense the lubricant and for opening the circuit to interrupt displacement of the piston upon standstill of the member.

Preferably the drive unit is a gas-generating system having an electrical circuit containing an electrochemical gas-generating cell and an electrical resistor. Generation of gas by this system, upon closure of the electrical circuit, provides pressure on the side of the piston opposite that along which the lubricant is provided and displaces the piston toward the end of the container whereby the lubricant is dispensed through the passage to the surface of the rotatable member. When centrifugal force is developed as a result of rotation, the switches of the centrifugal-force sensor both close and hence the electrical circuit is closed for generation of the gas. This can occur as soon as the predetermined minimum rotational speed is reached. Of course, once the speed drops below this predetermined minimum and, especially at standstill, at least one of the switches of the centrifugal force sensor will open to interrupt the circuit and prevent further gas generation.

The gas-generating device including the centrifugal switch arrangement is located within the container so that the latter can be completely closed and hence one need not be concerned about sealing at cable feed-throughs or the like.

For the lubrication of the hollow shaft, the lubricant container is preferably fitted into the hollow shaft itself with the discharge opening of the lubricant container communicating with a passage through the hollow shaft to the exterior.

Preferably the gas-generating device has a disk or sleeve-like carrier on which the gas-generating cell, the resistor and the centrifugal switch unit are mounted. The lubricant container can be a cylindrical tube closed at one end and fitted at its other end onto a closure formed in the passage. The gas generator can, alternatively, be provided in a gas-tight cap fitted onto a closable end of the lubricant container.

Alternatively, the drive may be an electric motor drive with a motor and stepdown transmission, the drive rotating a threaded spindle and the motor being connected in an electrical circuit with a battery. In that case, the centrifugal switches in that circuit close the connection between the battery and the motor when the speed of the hollow shaft is above a threshold level. The threaded spindle can engage female threads in the piston which is guided so that it cannot rotate relative to the spindle.

In this embodiment as well the displacement of the piston is effected when the centrifugal sensor detects a certain minimum speed of rotation. The circuitry can include a pulse generator which delivers pulses to the electric motor.

The electric motor system can include programming means to enable it to be programmed and in that case the control unit can include a clock and a contactless sensor with the clock generating starting pulses at predetermined time intervals for the electric motor and the sensor monitoring directly or indirectly the rotation of the shaft and, after a predetermined number of rotations, issuing a stop signal for the motor drive even though the centrifugal sensor is still detecting rotary speed of the hollow shaft. After a certain time interval the operation of the lubricant dispenser can begin again with the process being repeated until rotation of the hollow shaft ceases or falls below the predetermined minimum.

Advantageously the centrifugal force sensor includes at least two switches connected in series and spaced apart circumferentially and located eccentrically of the rotation axis so that at standstill at least one of the switches will be opencircuited. Unless all of the switches are closed, therefore, the lubricant drive will be cut off.

The switches can be operated by a freely-movable contact body or an electrically-conductive liquid which can be centrifugally thrown outwardly when the threshold speed of the rotatable shaft is exceeded.

The switches can be located with an inclination of the rotation axis to allow operation of the device when the hollow shaft, for example, is in a vertical orientation.

BRIEF DESCRIPTION OF THE DRAWING

The above and other objects, features, and advantages will become more readily apparent from the following description, reference being made to the accompanying drawing in which:

FIG. 1 is an axial section through a hollow shaft with a lubrication unit according to the invention built into it;

FIG. 3 is a diagram of the electrical circuit of that unit;

FIG. 5 is an axial section through another hollow shaft illustrating another embodiment of a lubrication device in place therein.

SPECIFIC DESCRIPTION

Figure 4:
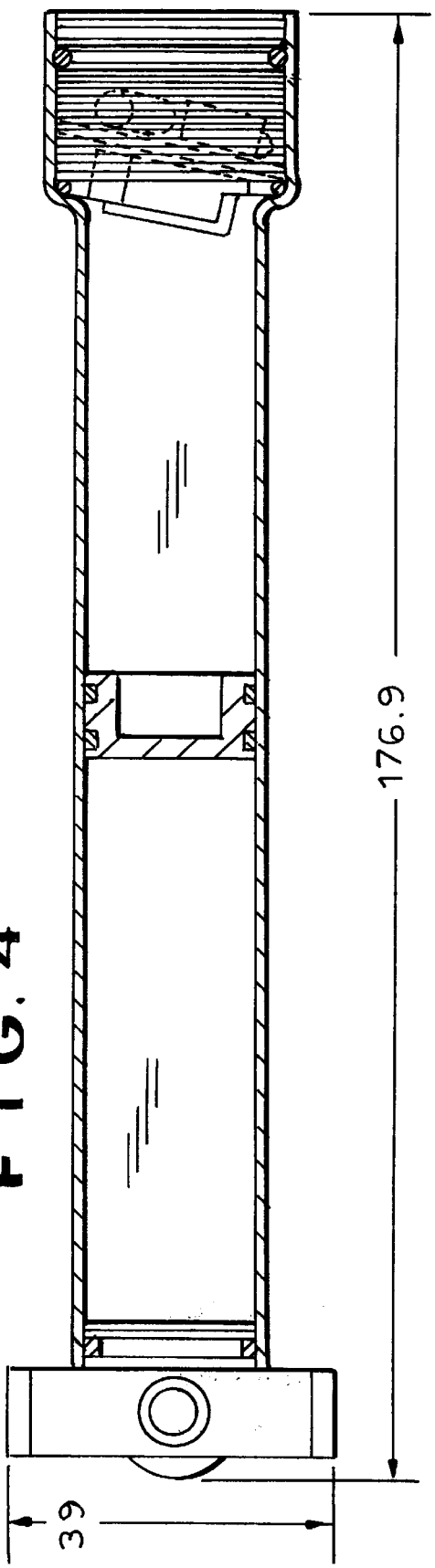
FIG. 4 is a longitudinal section of a lubrication unit for use in an application similar to that of FIGS. 1–3 but withdrawn from the hollow shaft.
Figure 2:
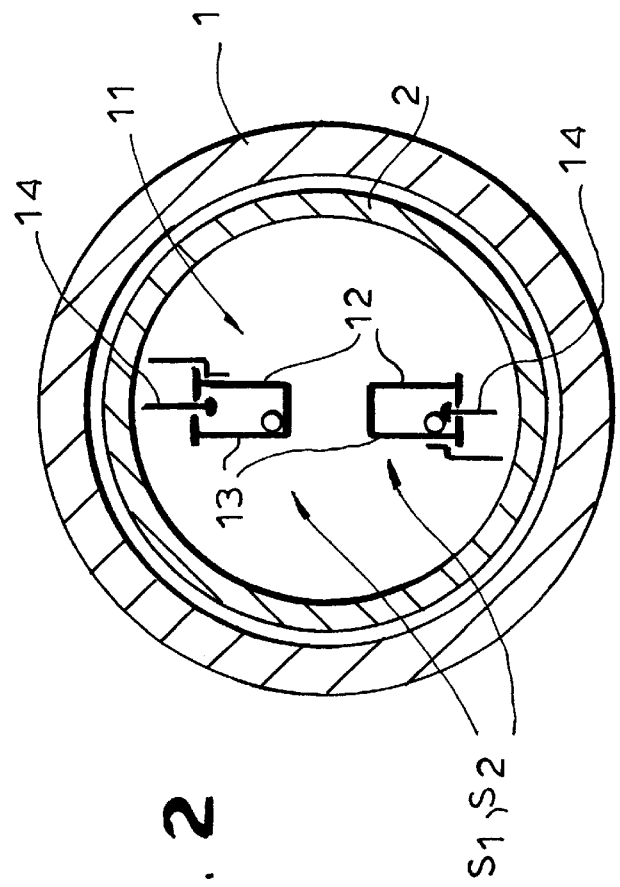
FIG. 2 is a transverse section through the centrifugal-force sensor of the apparatus of FIG. 1.

The system shown in FIG. 1 comprises a rotating hollow shaft 1 which, at an end thereof, is provided with a lubricating device.

While the hollow shaft 1 has not been shown to be profiled, over a portion thereof surrounded by a sleeve or shell 1a, it can be splined, of noncircular cross section or otherwise profiled to rotatably entrain or be rotatably entrained by the sleeve 1a as part of a clutch, coupling or the like, the sleeve 1a being axially shiftable on the shaft 1.

The purpose of the lubricating device, of course, is to lubricate the surfaces of members 1 and 1a which are juxtaposed with one another to facilitate the axial movement during rotation of the shaft 1.

The lubricating device, in turn, comprises a lubricant container 2, mounted in the end of the hollow shaft 1, a piston 3 axially shiftable in the lubricant container 2, a closure 4 for the lubricant container and a drive unit 6 for displacing the piston 3.

The closure 4 can be sealed against the inner wall of the removable and replaceable container 2 by a seal 15 received in a groove 4a in a boss 4b of the closure 4. The boss 4b is provided with a tubular extension 4c and is unitary (i.e. in one piece) with a cylindrical portion 4d which has radial bores 4e communicating with an axial bore 4f of the tubular portion 4c. The bores 4e communicate with outlet orifices 7 which open at the outer surface of the hollow shaft 1. The passages 5 thus are aligned with radial bores of the shaft 1 for this purpose.

The drive unit 6 is formed as a gas-generating device operated by a circuit 8 including an electrochemical gas-generating cell 9, preferably a zinc-air cell. This cell is connected in series with an electrical resistor 10 and a centrifugal force switching unit 11. The centrifugal force switching unit 11 is comprised of two switches Si and S2 (FIG. 3) connected in series and which are located outside of the axis of rotation of the hollow shaft. The centrifugal force sensor, moreover, can comprise two housings, 12 (2), each of which receives a freely moveable contact body 13 which can lodge between the radial contact 14 and the conductive housing 12 as shown for the body 13 in its lower position. In this position, the body 13 can make an electrical contact between the housing 12 and the respective contact 14. A conductive liquid, e.g. mercury, can be substituted for the body 13. When the system is at rest, at best only one of the switches Si, S2 can close. When, however, the device is rotated with sufficient speed to throw the body 13 centrifugally outwardly, both switches S1 and S2 are closed, i.e. each body 13 makes electrical contact between its housing 12 and the radial contact 14.

The switches S1 and S2 are spaced apart equidistantly in the circumferential direction so that at standstill at least one of the switches S1 or S2 remains open.

When the circuit is closed, i.e. switches S1 and S2 are closed simultaneously, gas is generated by the cell 9 to drive the piston 3 to the left and force lubricant along the outer surface of the shaft 1.

When of course, the centrifugal force sensor is at standstill, the circuit remains open and gas is not generated. As soon as the shaft is brought to standstill, therefore, the circuit will open, gas generation will terminate and lubricant no longer will be forced onto the outer surface of the shaft 1. Since the gas-generating unit 6 including the centrifugal force sensor 11 is wholly received in the lubricant vessel 2, it can be inserted as a single unit in the shaft 1 and removed therefrom and replaced as a unit. It provides, for reliable operation, a high degree of gas tightness at least with respect to the interior of the lubricant vessel. The lubricant vessel may be sealed at its end 2a, i.e. may be formed as a closed-end cylinder.

This closure 2 may remain anchored in the hollow shaft 1 via cylindrical fittings 16 which can engage in the closure 4. These nipples can be received in the passages 5. In that case, the housing 2 can be pulled off the closure 4 for replacement by a fresh cell and lubricant-filled vessel.

FIG. 1 shows a nipple 16 mounted in each lubricant output 7, engaging in the passage 5 and anchoring the closure 4 of the lubricant vessel 2 to the shaft. The embodiment shown in FIG. 4 has a centrifugal sensor or inclination switches S1 and S2 which are inclined to the rotation axis. With the inclined orientation of the switches S1 and S2, the lubricant dispenser can operate reliably even in the case of a hollow shaft or other component with a vertical rotation axis. From FIG. 4 it will also be apparent that the space for the centrifugal sensor can be enlarged, thereby enabling higher centrifugal force to be generated for the switching operation.

While the embodiments which have previously been described utilize a gas generator as the driving unit for the piston, the embodiment of FIG. 5 utilizes a battery-driven motor drive. The drive unit 6' in this embodiment comprises an electric motor 17 with a speed-reducing transmission which is capable of rotating a threaded spindle 18 and comprises a battery 19 received with the motor drive 17 and the centrifugally-operated switches S1 and S2 in the lubricant container 1. A printed circuit board 20 may be provided with the circuitry for operating the electrical motor and therefore connects the switches S1, S2, the battery 19 and the electric motor 17 in series.

The piston 3 is formed as a nut engaging the threaded spindle 18 and is guided in the container 2 so that it cannot rotate.

When the centrifugal sensor detects rotation of the shaft 1, the spindle 18 is driven to express the lubricant through the axial passage 4f and the radial passage 4e to the nipple 16 in the lubricant passage 5, thereby displacing lubricant along the outer surface of the shaft 1.

I claim:

1. In combination with a rotatable member, a lubricating device comprising:

a lubricant container on said rotatable member;

a piston in said container shiftable to displace lubricant in said container toward an end thereof;

a closure in said end of said container provided with a discharge passage opening at a surface of said member for dispensing said lubricant onto said surface upon displacement of said piston;

drive means in said container for shifting said piston and including an electrical circuit and a centrifugal force sensor in said circuit for closing said circuit upon rotation of said member to displace said piston and dispense said lubricant and for opening said circuit to interrupt displacement of said piston upon standstill of said member.

2. The device defined in claim 1 wherein a further rotatable member surrounds the first-mentioned rotatable member and said lubricant is discharged between said rotatable members.

3. The device defined in claim 1 wherein said drive means includes a gas-generating unit including an electrochemical gas-generating cell and an electrical resistance connected in said circuit.

4. The device defined in claim 3 wherein said unit is disposed on a carrier in said container and said centrifugal sensor is mounted on said carrier.

5. The device defined in claim 3 wherein said container comprises a tube closed at an end thereof containing said drive means.

6. The device defined in claim 3 wherein said container is comprised of a tube closed with a cap, said drive means being replaceably mounted in said tube and accessible upon removal of said cap.

7. The device defined in claim 1 wherein said drive means includes an electric motor-drive unit having a motor and a speed-reducing transmission, said circuit having a battery and a controller for said motor, said centrifugal-force sensor connecting said battery with said controller for shifting said piston upon rotation of said rotatable member.

8. The device defined in claim 7, further comprising a spindle driven by said motor and threadedly engaging said piston.

9. The device defined in claim 1 wherein said centrifugal-force sensor comprises at least two series-connected switches disposed eccentrically relative to an axis of rotation of said rotatable member and circumferentially spaced apart so that, upon standstill of said member, at least one of said switches is open-circuited.

10. The device defined in claim 9 wherein said switches are mounted at an inclination to said axis.

11. The device defined in claim 1 wherein said closure is provided with a seal enabling said container to be removably sealed to said closure, said closure having a plurality of discharge openings spaced apart along said surface.

12. The device defined in claim 11 wherein each of said discharge openings engages a nipple anchored in said rotatable member.

* * * * *